UNITED STATES PATENT OFFICE.

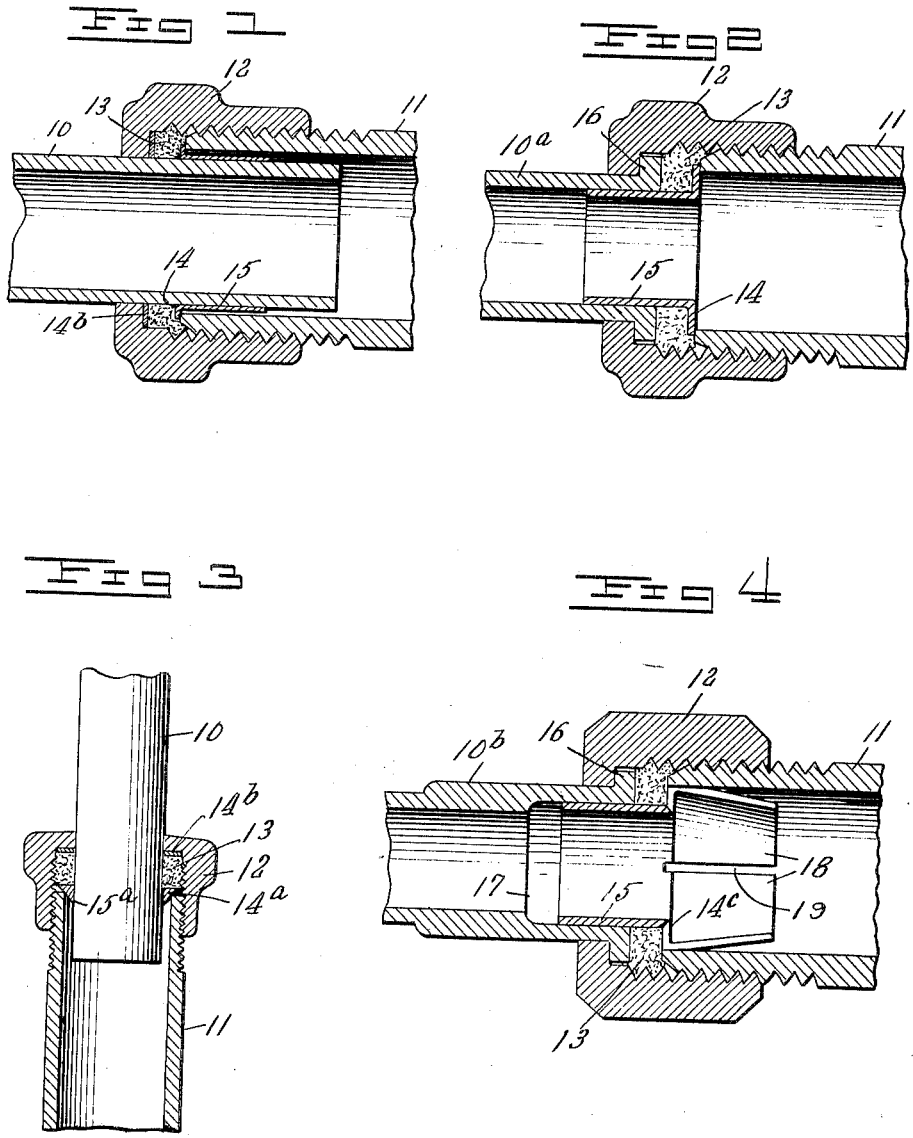

PHILIP MUELLER AND ANTON C. SCHUERMANN, OF DECATUR, ILLINOIS, ASSIGNORS TO H. MUELLER MFG. CO., OF DECATUR, ILLINOIS, A CORPORATION OF ILLINOIS.

PACKING-INCASING FERRULE.

1,116,609.

Specification of Letters Patent.

Patented Nov. 10, 1914.

Application filed May 6, 1913. Serial No. 765,869.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Packing-Incasing Ferrules, of which the following is a specification.

This invention relates to pipe couplings wherein a packing is employed for sealing the pipes of the couplings, and has particular reference to a packing retaining ferrule for use in connection with the coupling.

Considerable difficulty has been experienced in the use of pipe couplings, in which packings are employed, in maintaining the packings in their proper places when the coupling is assembled and when fluid under pressure is passed through the coupling. The usual coupling nut compresses the packing against the pipes and into the space between the pipes, whether telescoping or otherwise, and the fluid passing through the coupling crumbles, breaks off, and carries away such parts of the packing as are forced into this space. Then also when a building settles, and more especially when vibration in water pipes is caused by the quick closing of a faucet, by water-hammer or shaking of floors, the packing becomes weakened and loosens and seeks the path of least resistance, which is toward the service pipes. This condition loosens the packing and produces a leaky coupling, or, upon the tightening up of the coupling nut to compress the packing further into the space, wears out the packing in a very short time, since the fluid under pressure further attacks the newly exposed portions of the packing.

To overcome these difficulties; to produce a coupling which will last a relatively long time, and to produce a coupling which is not subject to leakage, is the principal object of this invention. It has been found in practice that this invention does overcome these difficulties, and by the employment of a very simple and economical device which may be introduced into the coupling without altering or changing the latter in any respect.

Broadly, this invention comprises a ferrule adapted for positioning between the ends of the pipes to cover the space left between the pipes, so that the packing, which is located against this ferrule cannot be compressed into this space under the action of the coupling nut when tightened. As will be hereinafter pointed out, this retaining ferrule may comprise simply a flat disk, the disk may have projections engaging the pipes to hold and center the disk in the coupling, or it may have any other desired form particularly adapting it to the coupling to which it is to be applied.

Other objects and advantages will appear from the following specification of the present embodiment of the invention disclosed in the annexed drawing.

In the drawing: Figure 1 is a longitudinal section through a coupling having a ferrule of this invention applied thereto. Fig. 2 is a similar view of a slightly different form of coupling having the ferrule applied to the same. Fig. 3 is a sectional view of the coupling of Fig. 1, showing a slightly modified form of ferrule applied thereto. Fig. 4 is a similar view of another form of coupling, and having another slightly modified form of ferrule applied to the same.

Referring to the drawing, in which similar characters of reference designate like parts throughout the several views, and referring particularly to Fig. 1, 10 and 11 designate a pair of pipes suitably secured together by a coupling nut 12. The coupling nut 12 is threaded upon the end of the pipe 11, and surrounds the other pipe 10 near its end, since the pipe 10 telescopes into the pipe 11, and compresses a packing 13, snugly embracing the pipe 10, against the end of the pipe 11. This form of coupling is the usual slip-joint coupling, and it will be understood that this invention is applicable to all forms of couplings, and is not restricted to the conventional showing in the accompanying drawing.

In Fig. 1 of the drawing the device or ferrule of this invention is disclosed in the form of a disk 14 abutting the end of the pipe 11 and fitting, at its inner edge, closely against the outer surface of the pipe 10. The packing 13 rests against the outer face of the disk 14, and is held thereto and compressed thereagainst by the coupling nut 12. This arrangement completely closes the annular space between the pipes 10 and 11 and prevents the packing 13 from entering such space. In this instance the disk 14 is disclosed as being provided with a sleeve 15 snugly embracing the pipe 10 and extending into the space between the pipes 10 and 11 for the purpose of maintaining the disk 14 in position.

In Fig. 2 of the drawing the pipe 10ª has an outturned flange 16 at its end which is positively engaged by the coupling nut 12 and held against the end of the pipe 11 thereby. The packing 13 is interposed between the flange 16 and the end of the pipe 11. When used in connection with this slightly different coupling, the ferrule or disk 14, is placed, in a similar manner against the end of the pipe 11 between the same and the packing 13, but the sleeve 15 is inserted into the end of the pipe 10ª in which the sleeve 15 tightly fits. With this arrangement, when the coupling nut 12 is tightened upon the pipe 11 it draws the pipe 10ª and flange 16 toward the pipe 11, compressing the packing 13 between the flange 16 and the end of the pipe 11, the ferrule 14 holds the packing 13 from spreading into the pipe 11, and the sleeve 15 prevents the packing 13 from spreading down between the flange 16 and the end of the pipe 11 and from entering the pipe 10ª.

In Fig. 3 of the drawing is disclosed a slight modification in the structure of ferrule connected to a slip-joint coupling, such as disclosed in Fig. 1. In this Fig. 3 the packing 13 is interposed between a pair of packing retaining ferrules 14ª and 14ᵇ. The ferrule 14ª appears against the end of the pipe 11 between the same and the packing 13, and surrounds the pipe 10 about which it snugly fits. Instead of having a projection or sleeve 15, the ferrule 14ª has its inner edge thickened thereby providing a projecting portion 15ª snugly embracing the pipe 10 and projecting into the space between the two pipes 10 and 11. By providing this projection 15ª the ferrule 14ª is given wedge form whereby it binds tightly between the pipes 10 and 11 and effectually closes the space. The harder the coupling nut 12 is tightened, the harder the packing ring 13 presses against the ferrule 14ª and wedges the latter into the space between the pipes, so that the retaining of the packing 13 in its true position and out of the space is insured. The ferrule 14ᵇ comprises merely a disk, as disclosed at 14 in Figs. 1 and 2, and is not provided with a projection. The ferrule 14ᵇ rests against the inturned flange of the coupling nut 12 and is carried thereby toward the pipe 11 when the coupling nut 12 is tightened thereon. The ferrule 14ᵇ fits closely about the pipe 10, prevents the packing 13 from spreading outwardly between the coupling nut 12 and the pipe 10, and serves as a friction ring between the packing 13 and coupling nut 12 so that the nut 12 cannot cut the packing into small pieces.

In Fig. 4 of the drawing the slightly different form of coupling is shown wherein the pipe 10ᵇ is slightly thickened at its end and provided with a counterbore 17 in which is snugly fitted the sleeve 15 of the packing retaining ferrule, and wherein the sleeve 15 does not interrupt or reduce the internal diameter of the pipe 10ᵇ. The pipe 10ᵇ has the flange 16 at its end coöperating with the coupling nut 12 to hold the pipe 10ᵇ to the end of the pipe 11. The packing 13 is located between the flange 16 and the end of the pipe 11. The packing retaining ferrule 14ᶜ is of the same form as the ferrule or disk 14 of Figs. 1 and 2, and is forced into the end of the pipe 11 instead of bearing directly against the extremity of the same. This ferrule 14ᶜ has not only the projection or sleeve 15, but is also provided with a second sleeve or projection 18 extending oppositely from the sleeve 15 and from the outer edge of the disk 14ᶜ and decreasing in diameter from the disk 14ᶜ to its outer end. The sleeve 18 thus tapers toward its outer end and is provided with a number of longitudinal slits 19 dividing the sleeve 18 into a number of yieldable fingers.

In positioning the ferrule 14ᶜ the tapering sleeve 18 is inserted in the end of the pipe 11 and is forced into the same until the ferrule 14ᶜ is wholly or partially within the end of the pipe 11. The sleeve 18 yieldingly binds in the pipe 11 in proportion to the variations in diameters of the pipes 10ᵇ and 11 and thus holds the ferrule in place. The sleeve 15 is forced into the counterbore 17 of the pipe 10ᵇ and centers the pipe in the coupling. The packing 13 is held in place between the flange 16, the end of the pipe 11 and the ferrule 14ᶜ and the sleeve 15, so that the packing 13 cannot expand into either of the pipes 10ᵇ or 11.

The coupling nuts 12 are bored, so that when they are tightly screwed onto the service pipes their openings through which the supply pipes extend are concentric with the openings of the service pipe. In view of this fact, since the supply pipes extend through the openings in the coupling nuts, the supply pipes have their outer peripheries concentric with the inner openings of the service pipes. Since the disks 14 and sleeves 15 are slipped over the ends of the supply pipes, when the supply pipes are placed through the coupling nuts, and the coupling nuts are screwed tightly onto the service pipes, the disks 14 and sleeves 15 are also concentric with the service pipes. The fact, that the outer diameter of the disks 14 is slightly larger than the internal diameter of the service pipes, permits the disks 14, since they are located concentrically with reference to the service pipes, to rest but a very short distance upon the service pipes 11, permitting the packing proper, to form a complete fluid tight joint between the coupling nuts, supply pipes and the service pipes, without working into or being pressed downwardly into the space between the service and supply pipes. The function of the ferrule is to retain the packing in position. The ferrule or disk 14 and sleeve 15, together with the end of the service pipe, the walls of the supply pipe and the coupling nut, incase the packing, so that a fluid tight joint must be formed.

This invention is not limited to the specific showing above set forth for the purpose of illustration, but contemplates a device for holding the packing in place in any form of coupling.

What we claim is:

1. In combination with a slip joint comprising a pair of telescoping pipes, a coupling nut joining the pipes and a packing in the coupling nut, of a packing incasing ferrule carried upon the inner pipe and engaging the end of the outer pipe whereby to confine the packing in the coupling nut and prevent the packing from spreading into the pipes.

2. In combination with a pair of telescoping pipes, a coupling nut joining said pipes, and a packing in said coupling nut surrounding the inner pipe and engaging the end of the outer pipe, of a sleeve slidably mounted on the inner pipe and having an outturned flange for engagement between said packing and the end of the larger pipe whereby to engage said packing between the pipes and the coupling nut and the flange.

3. In combination with a pair of telescoping pipes, of a coupling nut joining the pipes, and a packing in the coupling nut, of a sleeve on the inner pipe having an outstanding flange engaging against the outer pipe, said coupling nut being adapted to be tightened whereby to compress said packing between the flange and the coupling nut.

In testimony whereof we have hereunto set our hands in presence of two subscribing witnesses.

PHILIP MUELLER.
ANTON C. SCHUERMANN.

Witnesses:
LEONARD F. MCKIBBEN,
CATHERINE E. MCKEOWN.